United States Patent [19]

Kozyrski et al.

[11] Patent Number: 5,033,346
[45] Date of Patent: Jul. 23, 1991

[54] SHEET CUTTING MACHINE, AND CUTTING HEAD AND CLAMPING ASSEMBLIES THEREFOR

[75] Inventors: Vincent T. Kozyrski, Plainville, Conn.; Alan R. Peters, Cape Coral, Fla.

[73] Assignee: The Fletcher-Terry Company, Farmington, Conn.

[21] Appl. No.: 429,009

[22] Filed: Oct. 30, 1989

[51] Int. Cl.$^5$ ............................................... B26D 5/08
[52] U.S. Cl. ......................................... 83/464; 83/468; 83/465; 83/559; 83/620; 269/289 R; 82/46
[58] Field of Search .................... 83/186, 464, 522.15, 83/522.71, 591, 564, 451, 452, 464, 465, 468, 471, 507, 508.2, 508.3, 559, 592, 620, 621; 82/1.11, 11, 12, 13, 14, 15, 16, 46; 269/289 R, 303, 304, 305

[56] References Cited

U.S. PATENT DOCUMENTS

| | | | |
|---|---|---|---|
| 3,845,676 | 11/1974 | Pierce | 83/523 |
| 4,044,464 | 8/1977 | Schiess et al. | 30/164.9 |
| 4,112,793 | 9/1978 | Pierce | 83/522.21 |
| 4,233,736 | 11/1980 | Duggins et al. | 30/293 |
| 4,244,106 | 1/1981 | Pierce | 30/164.9 |
| 4,351,111 | 9/1982 | Carr | 30/164.9 |
| 4,590,834 | 5/1986 | Sobel | 83/564 |
| 4,790,222 | 12/1988 | Morgan | 83/464 |
| 4,878,409 | 11/1989 | Carithers, Jr. | 83/564 |

Primary Examiner—Frederick R. Schmidt
Assistant Examiner—Blynn Shideler
Attorney, Agent, or Firm—Ira S. Dorman

[57] ABSTRACT

A machine having a cutting head assembly and a clamping system is provided for cutting shapes in planar workpieces. A pair of separately operated blades are convergently disposed to enable the formation of an edge bevel on the workpiece by cutting it from either side, and also to enable facile V-grooving. The clamping system securely and inobtrusively secures the workpiece in cutting position.

19 Claims, 9 Drawing Sheets

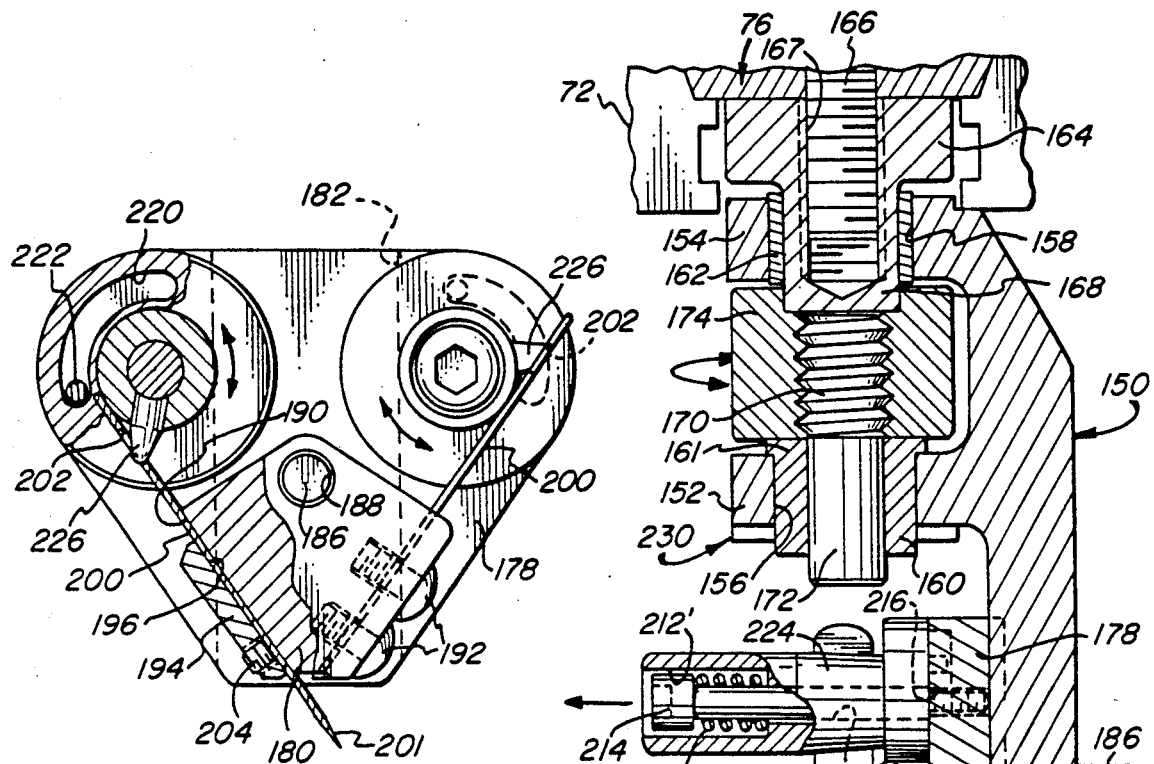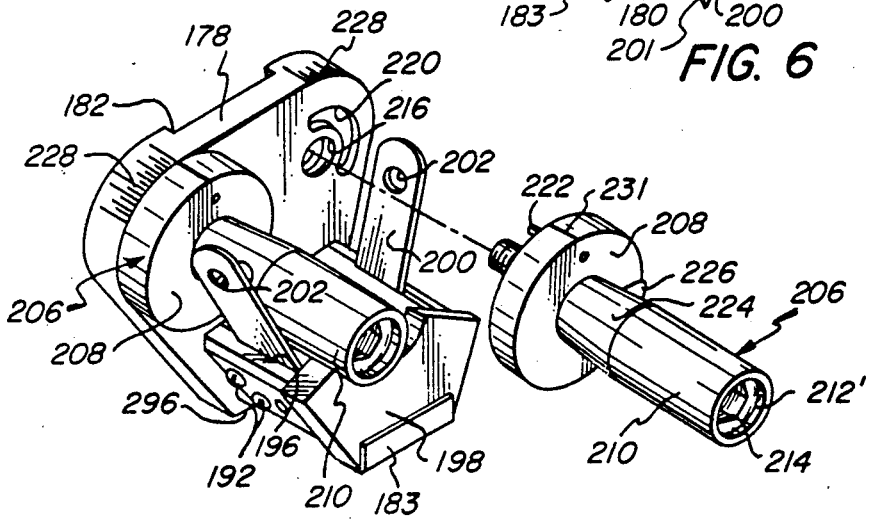

SHEET CUTTING MACHINE, AND CUTTING HEAD AND CLAMPING ASSEMBLIES THEREFOR

CROSS REFERENCE TO RELATED APPLICATION

This application is a related application of copending application Ser. No. 07/380,217, filed July 14, 1989,

BACKGROUND OF THE INVENTION

Sheets of cardboard mat, glass and other materials are frequently cut to provide components having openings and/or perimeters of rectangular, circular or elliptical (generally referred to as "oval") configuration. Such components are widely used for mounting and framing of pictures and the like.

Machines are known in the art, and are commercially available, for cutting planar workpieces to such shapes; exemplary of machines designed for cutting circles and ovals is the device described in Pierce U.S. Pat. No. 4,112,793, issued Sept. 12, 1978. Although many of the known machines are highly effective for their intended purposes, often they are not optimal in various respects.

For example, in cutting openings in mat board for framing pictures the blade will generally be inclined at a nonperpendicular angle, so as to produce a beveled edge on the mat. Because the incline of the blade is predetermined, cutting must occur either from the front or the rear of the workpiece; i.e., there is usually no choice. Furthermore, it is often desirable to produce a V-shaped groove in the surface of the mat board surrounding the opening cut, and in many instances the means provided for doing so is unsatisfactory, or indeed the cutting head is not at all suited to that purpose.

It is of course necessary in any such machine that the sheet material workpiece be maintained securely in position, so as to promote ultimate accuracy and perfection in the cut produced, and that therefore effective means be provided for clamping the work in place. It is also desirable that the clamping system be as unobtrusive as possible, so as to avoid any possibility of interference with the cutting mechanism; this is particularly important when the mechanism moves widely during operation. As will be appreciated, systems such as that which are shown in the above-cited patent are not optimal in this respect.

Accordingly, it is the broad object of the present invention to provide a novel machine for cutting shapes in planar workpieces, which permits facile and effective clamping and precise positioning of the workpiece, which permits accurate cutting of bevels from either the front or back of the workpiece; and which permits convenient and accurate V-grooving thereof.

A more specific object of the invention is to provide a novel clamping system affording the foregoing benefits, which is, in addition, of relatively uncomplicated design and construction, which does not intrude into the cutting space, and which imposes no load on the cutting mechanisms or on the structure by which it is supported.

Another more specific object is to provide a novel cutting head and head assembly affording the foregoing benefits, which is, in addition, of relatively uncomplicated design and construction, and which is capable of readily disposing either of two blades in an optimal position for effective cutting of the workpiece, and for producing cut edges which may be virtually flawless.

SUMMARY OF THE INVENTION

It has been found that certain of the foregoing and related objects of the invention are attained by the provision of a machine for cutting shapes in a planar workpiece, which comprises a frame and an attached base, the base having a back portion, with parallel, rectilinear marginal side edges, and a planar upper surface for disposing a workpiece in position for cutting by the machine. Structure on the frame serves to support a mechanism which mounts a cutting head assembly proximately over the base, and to move the assembly for cutting a workpiece disposed thereon, and a clamping system is provided for securing the workpiece in cutting position.

The cutting head employed in combination with the foregoing assembly comprises a head, which includes a wall portion and a laterally extending base portion with downwardly convergent sides. Substantially rectilinear channels in the sides of the base portion, disposed in planes lying to opposite sides of a medial plane thereof, open to the bottom plane on which lies the lowermost element on the bottom surface of the head, and the planes in which the channels lie intersect one another therebelow. The head assembly also includes a pair of cutting blades, each having a cutting element on one of its opposite ends and an engagement element spaced therefrom, the engagement element normally being disposed adjacent the other end of the blade. One of the blades is slidably mounted in each channel of the base portion of the head with its cutting element downwardly disposed and with its engagement element disposed outwardly of the upper end of the associated channel. A pair of operating members, rotatably mounted on the wall portion of the head, extend laterally over its base portion. Each operating member has a contacting portion, adapted to facilitate its manual rotation, and an engagement element adapted to cooperate with the engagement element of one of the blades to translate rotary movement of the operating member into substantially linear movement of the blade. The operating members and blades are proximately positioned and operatively interengaged to effect extension and retraction of the blades, to thereby move the cutting elements thereof through the bottom plane of the base portion.

Generally, each of the blades employed in the cutting head assembly will be of rectilinear, flat planar form with parallel side edges extending between its opposite ends. The operating members utilized will preferably include a disk portion and stem portion, and most desirably the operating member will be in the form of a dial having indicia thereon to cooperate with indicia on the wall portion of the head to indicate positions of angular displacement of the dial relative thereto. In particular, the wall portion of the head may have outwardly disposed shoulders, each with an arcuate edge profile having a radius substantially equal to the radius of the disk portions of the dials and carrying the indicia, and with each dial being mounted with its circumferential edge in registry with the edge profile of one of the shoulder elements. The wall portion of the head will preferably be of symmetrical form, having an axis of symmetry lying in a medial plane between the planes in which the channels of the base portion lie. In many instances the head assembly of the invention will additionally include means for pivotably mounting the head, and the axis of pivoting will advantageously lie substantially in the medial plane as well as in a plane including the longitudinal medial axes of the blades.

The clamping system of the machine comprises a T-bar having a rectilinear crosspiece of a length greater than the width of the back portion of the base, and an elongate, rectilinear tail piece having one end affixed to the crosspiece at a location intermediate its ends. Each opposite end portion of the crosspiece has a bore extending from top to bottom through it, which is disposed outwardly of the base portion marginal edges. The system also includes an elongate, rectilinear clamping piece having an upwardly extending lengthwise channel in which the crosspiece of the T-bar is seated. A front wall portion of the clamping piece has a rectilinear lower edge along its length, providing an underlying contact surface for grippingly engaging a planar workpiece against the upper surface of the base; the clamping piece also has an upwardly disposed bearing surface, and apertures, formed through its opposite end portions, which are disposed in overlying registry with the bores of the crosspiece.

In addition, the system includes a pair of clamping assemblies, each comprising a clamping head, a jacking member, and an elongate tensioning member extending between the jacking member and clamping head, and having upper and lower end portions secured to them. An intermediate portion of the tensioning member of each clamping assembly passes through the aligned bore and aperture, respectively, of the associated portions at the opposite ends of the crosspiece and clamping piece, and each clamping head has an engagement portion disposed in underlying engagement with the base of the machine along one of its marginal edges. One of the jacking members is mounted on the upper end portion of the associated tensioning member, for pivotable movement about an axis perpendicular to its longitudinal axis, and it has at least one arcuate surface that is so adapted and disposed as to bear upon the bearing surfaces of the clamping piece. It exerts a downward force upon the clamping piece during movement from a first position to a second position, to thereby urge the contact surface thereof toward the upper surface of the base.

A clamping block is disposed adjacent the back portion of the base, and is adapted to slidingly engage the tail piece of the T-bar therewithin for disposing the crosspiece and clamping piece at selected positions on the upper surface, along the back portion of the base. Cooperating means is provided on the tail piece and clamping block for disengageably securing the tail piece in any such selected position.

The clamping piece of the mechanism will preferably be of U-shaped cross-section to provide front, rear and top wall portions joined to one another, with the top wall portion at least in part providing the bearing surface against which the jacking members act. The clamping assemblies will advantageously include fastening means for securing the lower end portion of the tensioning member to the clamping head. The fastening means will most desirably be adjustably engaged with the lower end portion of the tensioning member, so as to enable variation in the spacing between the jacking member and the clamping head, and biasing means will normally be included for exerting a separating force upon those components.

Other objects of the invention are attained by the provision of a novel head assembly having the features hereinabove and hereinafter described. Still other objects are attained by the provision of novel clamping system, also having features so described.

BRIEF DESCRIPTION OF THE DRAWINGS

FIG. 6 is a fragmentary sectional view, taken along line 6—6 of FIG. 3 and drawn to an enlarged scale, showing a cutting head embodying the invention, taken along its medial plane, and also showing the support structure therefor, all as employed in the machine of FIGS. 1-4;

FIG. 7 is a perspective view of the cutting head, with the operating dial or spool for one of the blades displaced from the supporting wall for clarity of illustration;

FIG. 8 is a fragmentary elevational view of the cutting head;

DETAILED DESCRIPTION OF THE ILLUSTRATED EMBODIMENTS

Figure 1:
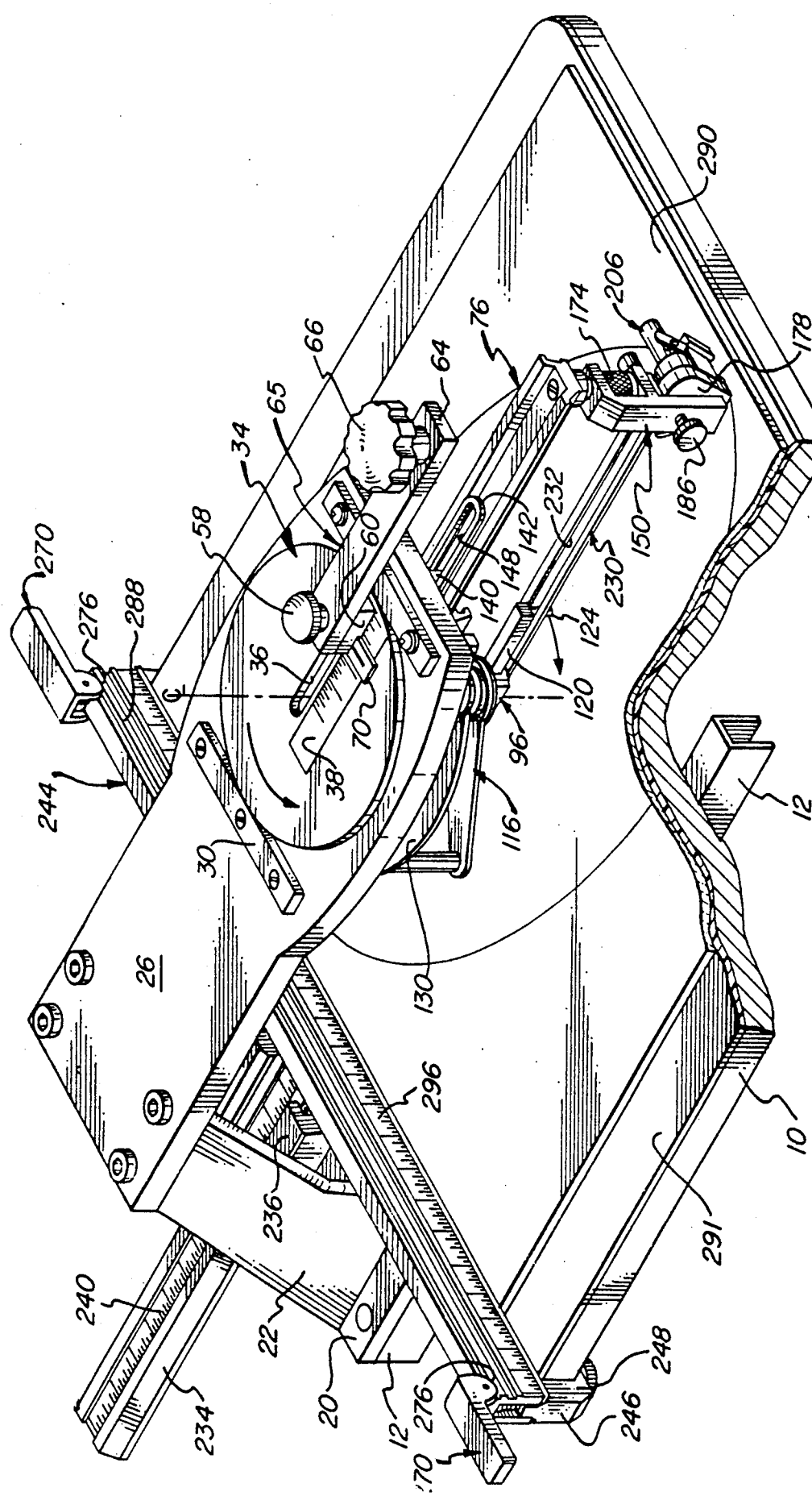
FIG. 1 is a fragmentary perspective view of a machine embodying the present invention.
Figure 2:
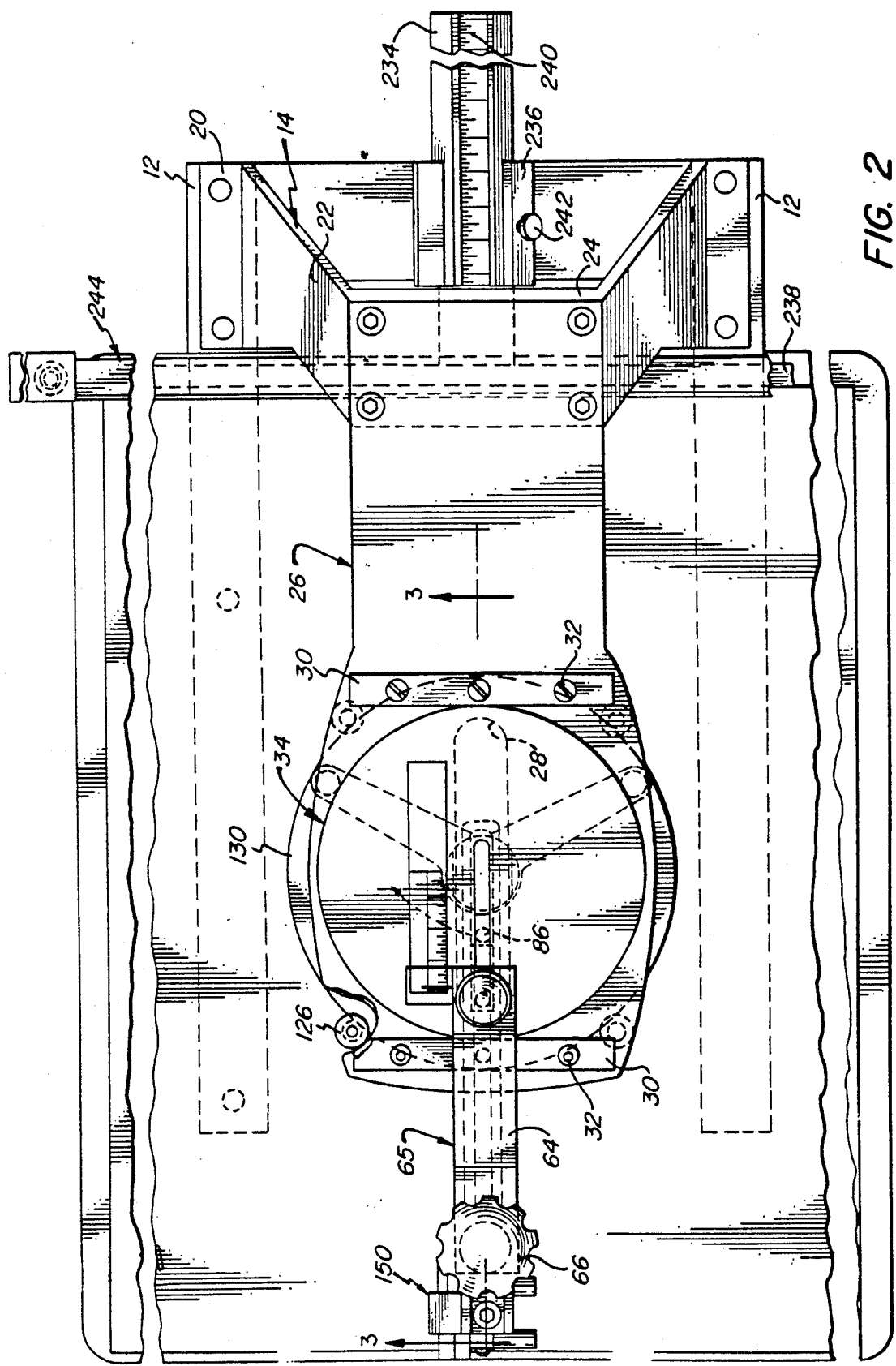
FIG. 2 is a fragmentary plan view of the machine of FIG. 1.
Figure 3:
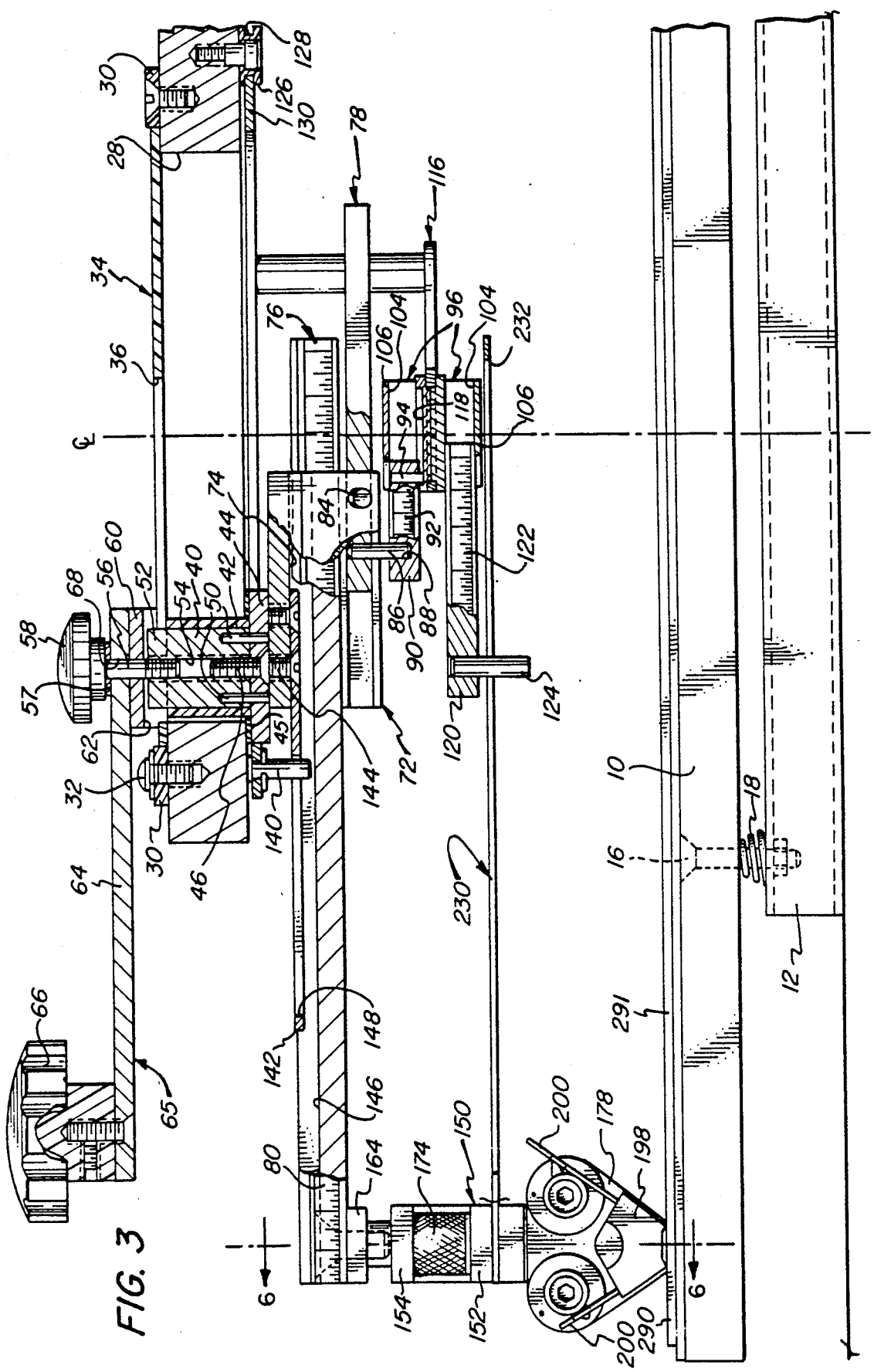
FIG. 3 is a fragmentary sectional view of the machine, taken along line 3—3 of FIG. 2 and drawn to an enlarged scale.
Figure 4:
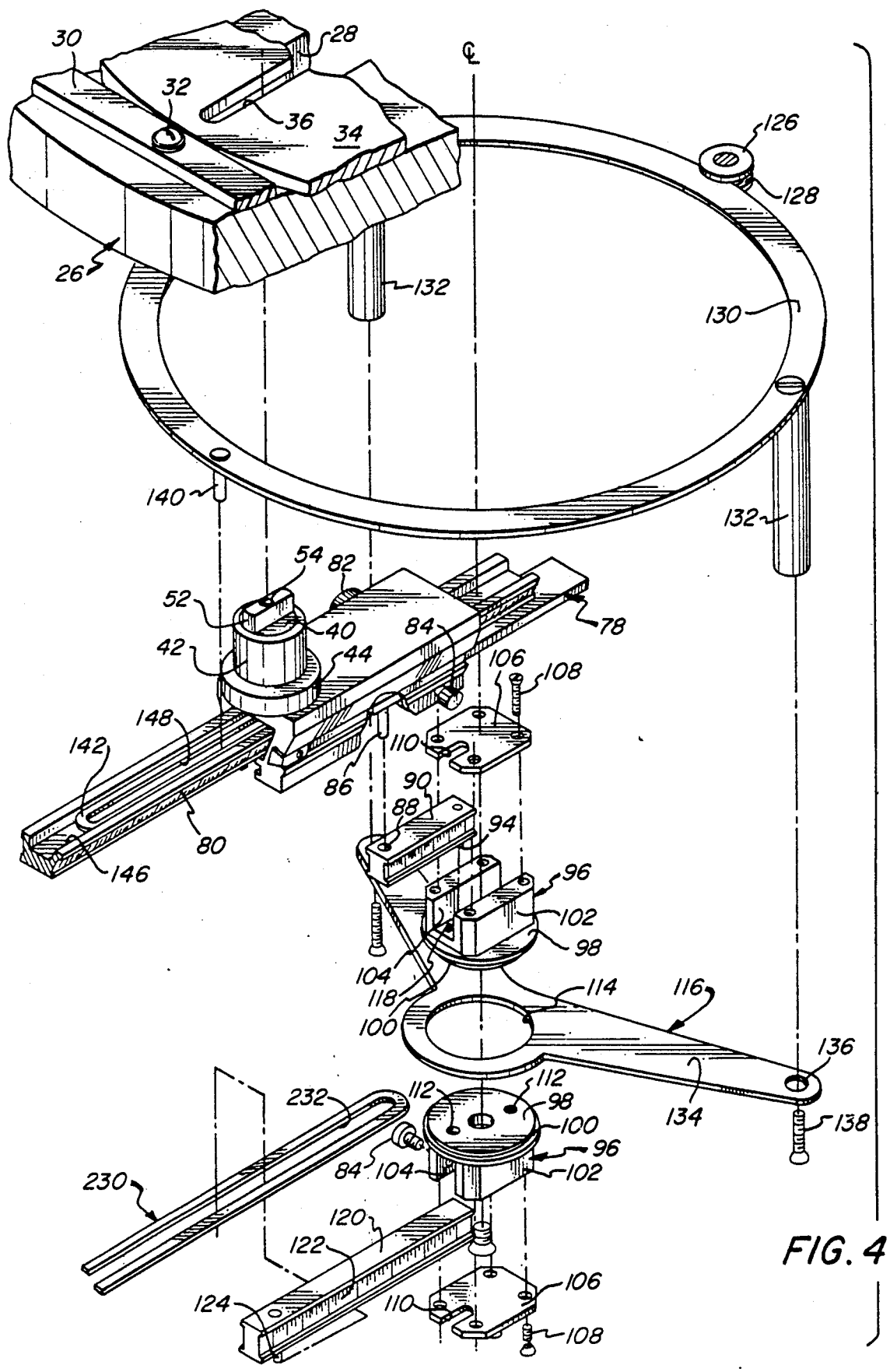
FIG. 4 is a fragmentary, exploded perspective view showing features of the mechanism of the machine by which control of the Path of movement and orientation of the cutting head are achieved.
Figure 5A:
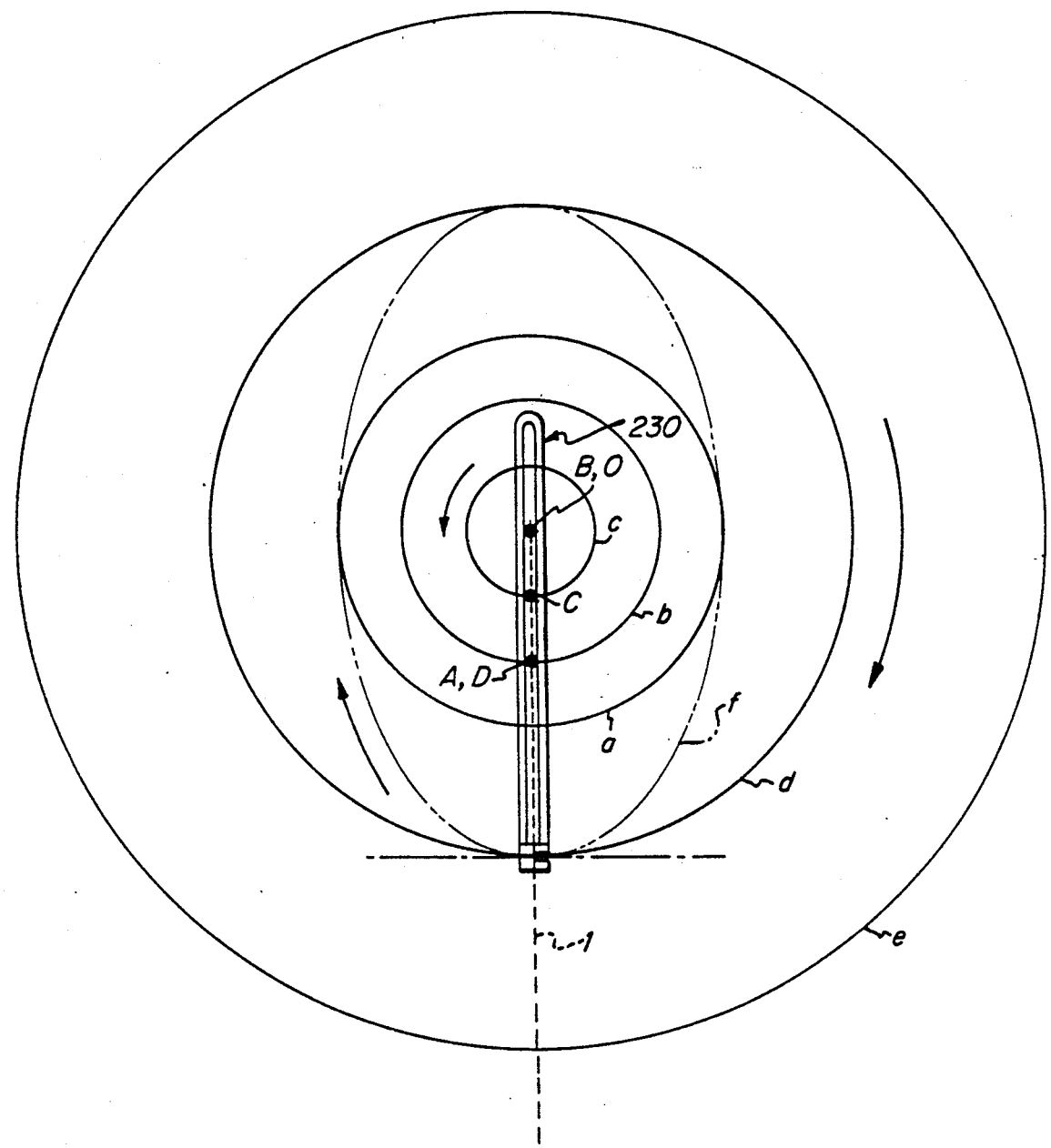
FIGS. 5A-5E are sequential schematic representations showing an orientation control arm for a cutting head at progressive positions during the cutting of one quadrant of an oval, and also showing geometric elements involved in producing the head orientation control.
Figure 5B:
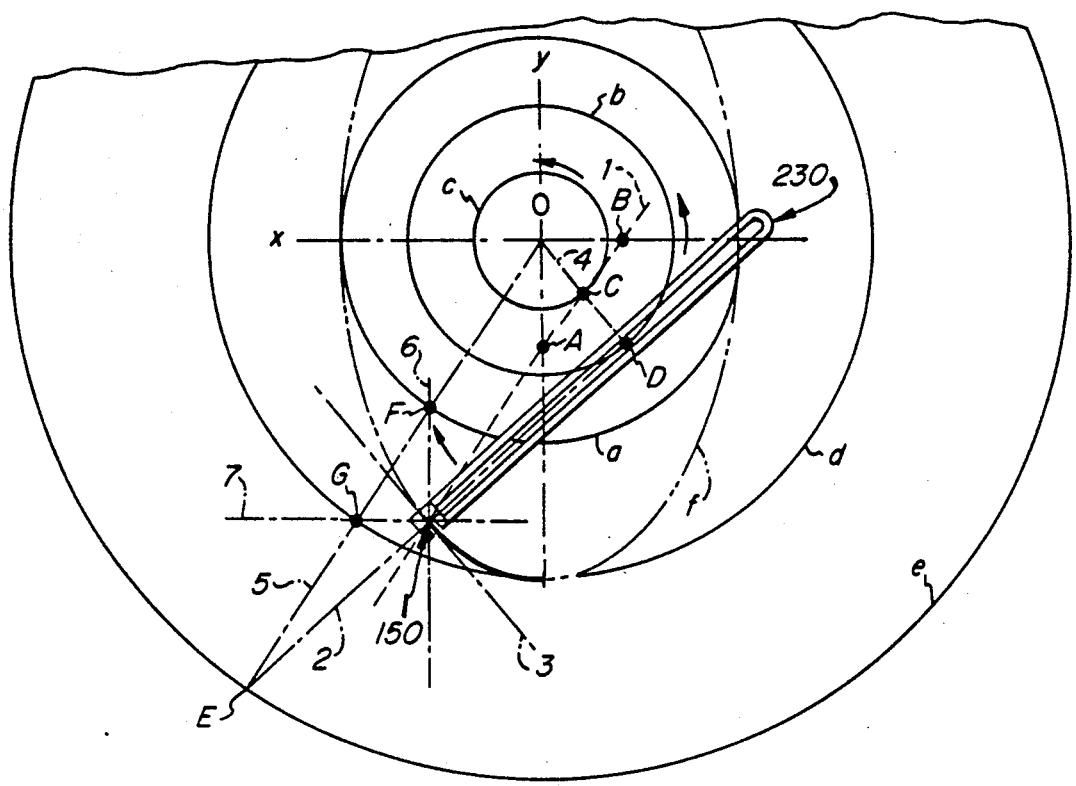
Figure 5C:
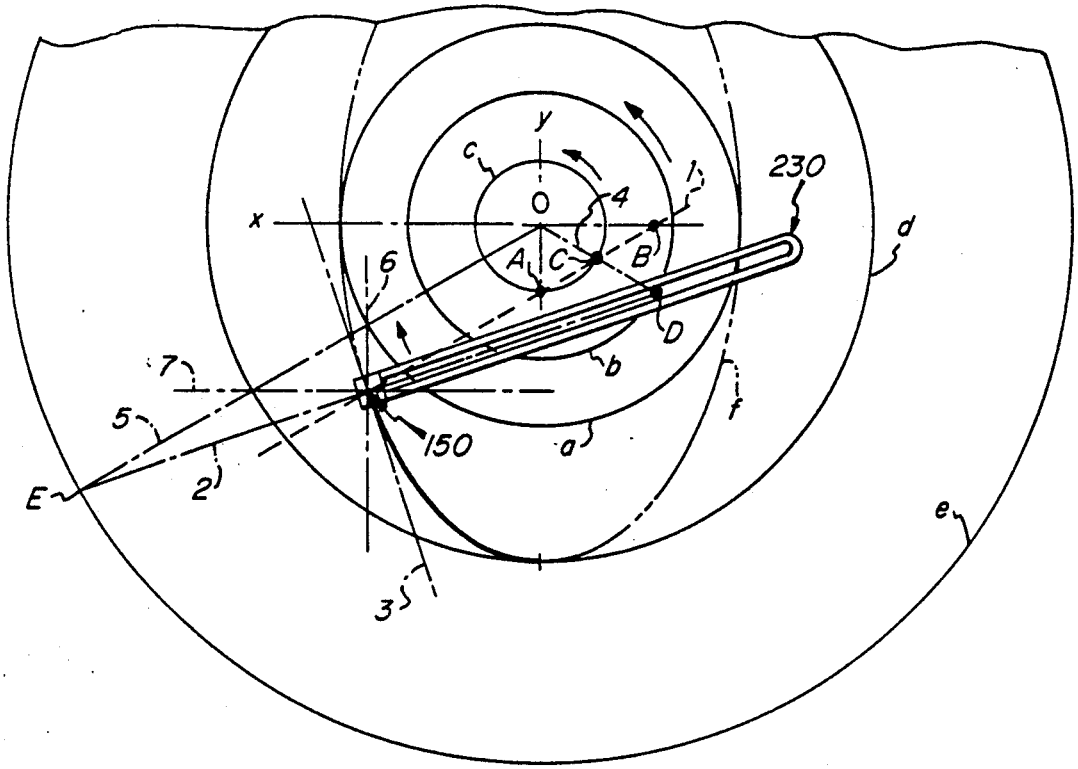
Figure 5D:
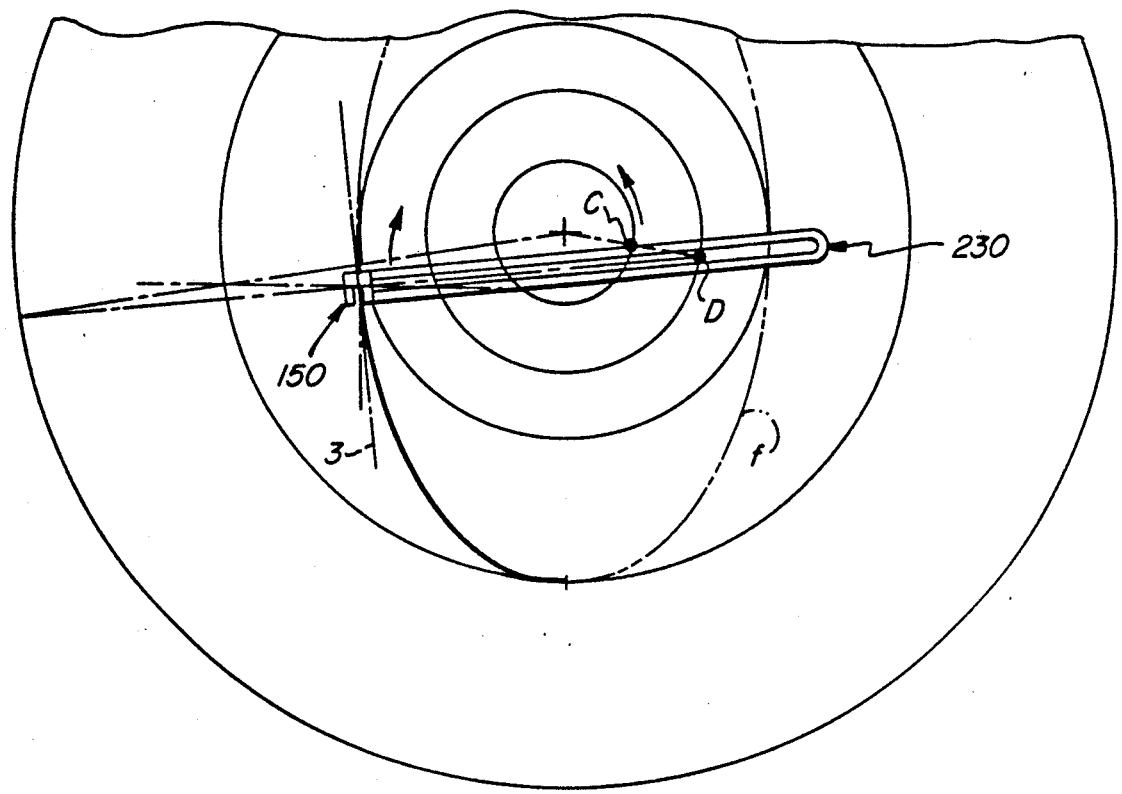
Figure 5E:
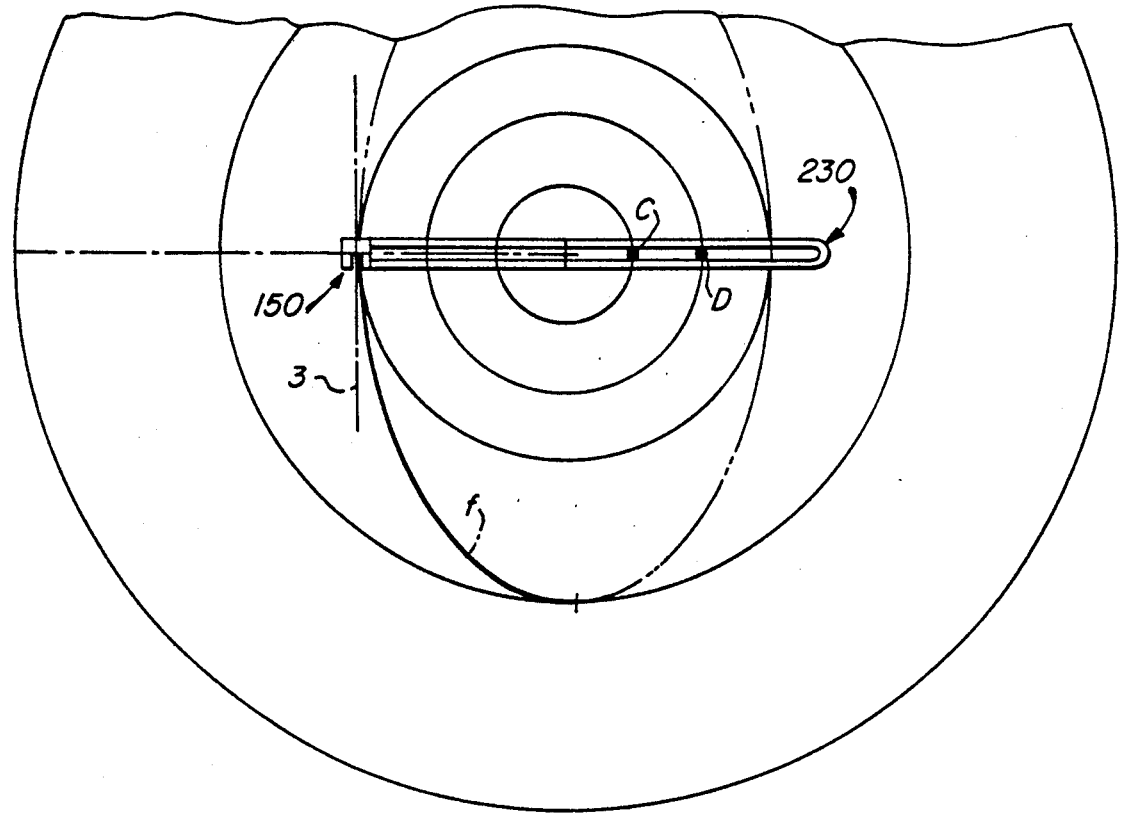
Figure 9:
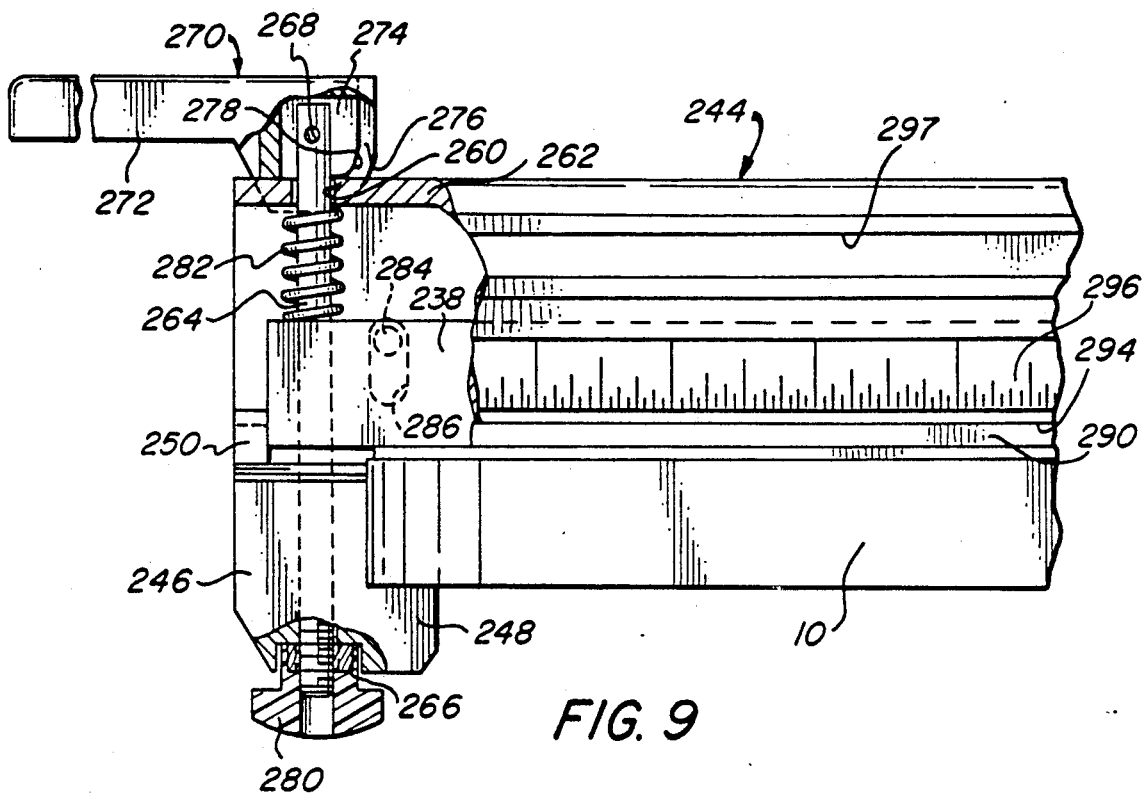
FIG. 9 is a fragmentary front elevational view of the clamping system embodying the invention, employed in the machine of the foregoing Figures.
Figure 10:
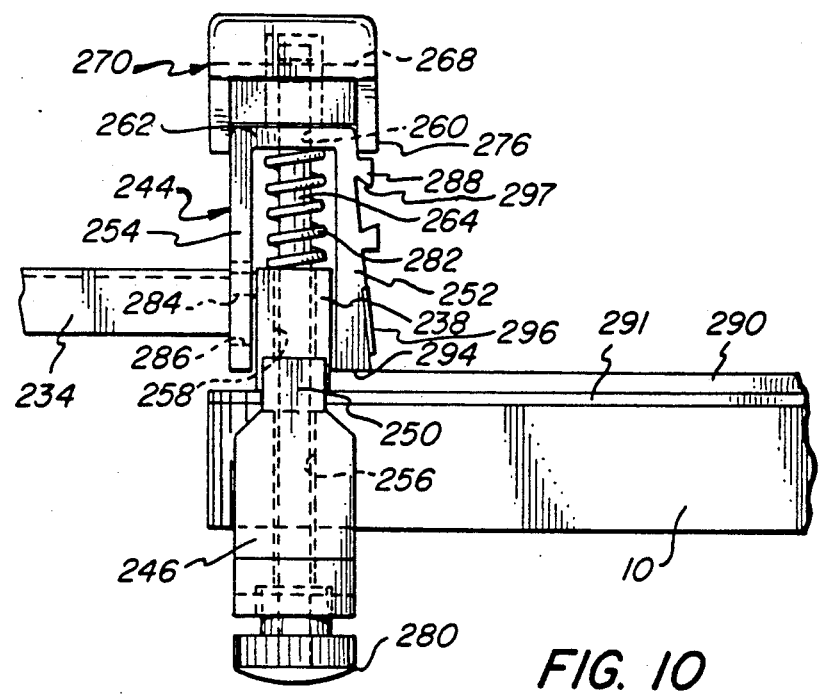
FIG. 10 is a fragmentary end elevational view thereof.

Turning now in detail to FIGS. 1-4 of the appended drawings, therein illustrated is a machine embodying the present invention and including a rectangular base board 10 yieldingly supported upon a pair of U-shaped runners 12, the base board being secured thereto by nut and bolt fasteners 16 (one of which is shown in FIG. 3) with a small conical coil spring 18 interposed therebetWeen. A stand, generally designated by the numeral 14, is secured to the rear ends of the runners 12 by fasteners passing through flanges 20 at the lower ends of legs 22, and an overhead support arm, generally designated by the numeral 26, is bolted to the upper crosspiece 24 of the stand 14, to project forwardly therefrom over the base board 10.

A slot 28 extends along the longitudinal axis of the arm 26 in the forward, free end portion thereof. Two parallel, rectilinear gibs 30 (normally made of a low-friction synthetic resinous material, such a Delrin) are secured to the upper surface of the arm at the opposite ends of the slot 28. The gibs have smooth inner surfaces, and one of them may be formed with oversized holes for receipt of the screws 32 with which it is held in place on the arm 26, so as to permit fine adjustment to attain strict perpendicularity to the axis of the slot 28.

Although not illustrated, the upper surface of the arm 26, in the area between the gibs 30, will normally have a low-friction surface component thereon, such as may be provided by a suitably configured plastic covering washer.

An upper disk, generally designated by the numeral 34, is disposed on the top surface of the arm 26 with its circumferential edge bearing upon the inside surfaces of the two gibs 30. It has a slot 36 therethrough formed along a diametric axis and extending essentially to one side of the center of the disk; a distance scale 38 is provided adjacent the slot 36.

A center shaft assembly is rotatably and slidably received within the slot 28 of the arm 26, and includes a cylindrical center shaft core piece 40 carrying a cylindrical plastic bushing 42, dimensioned to span the slot 28 and to closely engage its lateral surfaces. A lower disk 44 is attached to the core piece 40 by a screw 46, with a plastic washer 45 interposed therebetween, and the components are affixed against relative rotation by pins 50. The upper end of the core piece 40 has a diametrically extending tongue element 52, the parallel side surfaces of which slidably engage the lateral surfaces of the slot 36 of the upper disk 34. Extending axially through the core piece 40 is a threaded bore 54, at the upper end of which is engaged the threaded shank 56 of a clamping knob 58, and at the lower end of which the screw 46 is engaged. A U-shaped clamping block 60 is disposed on top of the disk 34, and has a channel 62 extending through it within which the tongue element 52 of the core piece 40 is received.

The operating handle, generally designated by the numeral 65, consists of a bar 64 with a knob 66 rotatably mounted on one end and with an aperture 68 through its opposite end, the latter receiving the shaft 56 of the clamping knob 58 (with a washer 57 interposed under the head), to thereby attach the handle to the center shaft assembly. The clamping block 60 mounts a laterally extending, transparent indicator piece 70, disposed over the scale 38 so as to permit setting of the center shaft assembly at any selected point along the length of the slot 36; the first line on the scale, nearest the center of the disk, lies at the geometric center thereof. It should be noted that the components are of suitable lengths and thicknesses to ensure that the upper disk 34 will be clamped between the block 60 and the core piece 40 when the knob 58 is tightened, to affix the center shaft assembly to the disk while leaving both free to move relative to the support arm 26.

As will be appreciated by those skilled in the art, the mechanism hereinabove described employs the "Scottish yoke" principle, which is also embodied in the machine shown in the above identified Pierce U.S. Pat. No. 4,112,793. It serves to permit generation of elliptical shapes, each with a major axis that varies from its minor axis by a dimension that is determined by the setting of the center shaft assembly relative to the center of the disk, at an "offset" value. To the extent that it may be helpful to an understanding of the form and operation of the Scottish yoke mechanism employed herein, the specification of the aforesaid said Pierce patent is incorporated hereinto by reference.

An extruded metal (e.g., aluminum) housing, generally designated by the numeral 72, is secured (by screws, not shown) to the lower disk 44 of the center shaft assembly, and has a downwardly opening compound passageway 74 therethrough, which is configured to slidably mount a cutter arm, generally designated by the numeral 76, and a transmission slide, generally designated by the numeral 78. A distance scale 80 is provided along the length of the cutter arm 76, and a clamping screw 82 extends through the wall of the housing 72 and into the passageway 74; it cooperates with a shoe (not seen), which bears upon the side of the cutter arm 76 opposite to that on which the scale 80 is provided, so as to secure the arm in any selected position of extension.

The transmission slide 78 is similarly engaged in selected positions of extension from the housing 72 by use of the locking screw 84. A pin 86, fixed adjacent one end of the slide 78, projects downwardly through the open bottom of the passageway into engagement in a circular socket 88 (normally lined with a press-fit bushing) formed into one end of a half-scale slide 90; a half-dog set screw 94 is affixed to the opposite end of the slide 90, and a distance scale 92 extends longitudinally along one of its side surfaces.

A hub assembly consisting of two substantially identical pieces, each generally designated by the numeral 96, is disposed beneath the housing 72. Hub piece 96 consists of a circular base portion 98 providing a circumferential shoulder 100 thereabout, and a pair of projecting parallel walls 102 define a channel 104 between them. A cover plate 106 is secured over the channel 104 on the end faces of the walls 102 by four screws 108, and the plate is notched at 110 for a reason that will be clear from what follows.

The hub pieces 96 are affixed to one another with the faces of the base portions 98 in confronting contact and with the channels 104 thereof in alignment; they are held together by screws (not shown) engaged within the apertures 112. The shoulders 100 cooperate to form a circumferential groove, by which the assembly is rotatably mounted in the circular opening 114 of an angular mounting bracket, generally designated by the numeral 116; it should be noted that the hub assembly is thereby positioned to rotate on its own axis, coincident with the centerline of the machine.

The half-scale slide 90 is slidably engaged within the channel 104 of the uppermost hub piece 96, the half-dog set screw 94 carried thereby serving to limit extension and thereby to prevent inadvertent disassembly; as can be seen, the tip of the screw 94 is seated within the slot 118 formed into the inner surface of the disk portion 98. The mated hub piece 96 slidably engages an actuating full-scale slide 120, which has a scale 122 along one lateral surface and which carries a depending pin 124 at its outer end. It should be noted that the actual distance between the integers (and the graduations) of the scales 38, 80 and 122, on the upper disk 34, the cutter arm 76, and the full-scale slide 120, respectively, are the same, whereas the corresponding distances on the scale 92 of the half-scale slide 90 are half those values. The distances shown on the scales 38, 92 and 122 are representative of the offset (in inches) that is to be produced; the distances shown on the scale 80 are representative of the minor diameter value that the oval is to have. The full-scale slides 90 and 120 are held in selected positions by use of locking screws 84, which are threadably engaged within the walls 102 of the hub pieces 96.

Secured to the underside of the supporting arm 26 are four rollers 126, which are circularly disposed, at suitable intervals, relative to the machine centerline. The rollers 126 engage within their circumferential grooves 128 the outer marginal edge of a support ring 130, for rotation under the arm 26. Two posts 132, separated by 120°, are attached to the ring 130, and they in turn support the angle bracket 116, the ends of the bracket arms 134 being provided with apertures for the receipt of screws 138 for that purpose. As previously noted, the support system is so constructed as to position the center of the circular opening 114 in the angle bracket 116 (and thereby the axis of rotation of the hub assembly) on the centerline of the machine (as so designated in the Figures). The centerline constitutes an axis extending normal to the parallel planes of the upper surfaces of the support arm 26 and the base board 10, at the intersection of the slot 28 with an imaginary medial line extending parallel to the confronting surfaces of the gibs 30, halfway therebetween.

A pin 140 extends downwardly from the ring 130 at a point equidistantly spaced from the posts 132. Bracket 142, attached by screws 144 against the top wall of the housing 72, extends therefrom within a longitudinal channel 146 formed along the top of the cutter arm 76. The bracket 142 is slotted lengthwise to slidably receive the pin 140 that depends from the ring 130, as a result of which the ring is rotated by action of the cutter arm 76, so as to avoid interference between the arm and the posts 132 that support the bracket 116.

With additional reference now to FIGS. 6–8, the cutter head assembly, mounted upon the free outer end of the cutter bar 76, includes an F-shaped bracket, generally designated by the numeral 150. The laterally extending elements 152, 154 of the bracket are formed with vertically aligned openings 156, 158, within which are seated, respectively, a bushing 160, having an upper retaining flange portion 161, and a bearing sleeve 162.

A mounting post has an enlarged head portion 164 abutted against the bottom surface of the cutter arm 76, and is secured thereto by a screw 166 engaged within its threaded bore 167. The post has two reduced-diameter cylindrical bearing portions 168, 172, which serve to pivotably support the bracket 150, and a threaded intermediate portion 170 therebetween. The threaded portion 170 engages a knurled collar 174, which bears upon the bushing flange portion 161 and is turned to effect adjustment of the vertical position of the bracket 150 on the mounting post.

The cutter head assembly is mounted upon the vertical leg portion 176 of the bracket 150, and includes a body having a lateral wall portion 178 and a base block 180, the leading lower marginal portion 181 of which is covered with a piece 183 of low-friction tape. A medial channel 182 extends along the back surface of the wall portion 178, and slidably engages the leg portion 176 of the bracket to ensure proper orientation of the cutter head, the assembly being maintained by engagement of the screw 188 within the threaded aperture 189.

The base block of the cutter head, which is symmetrical about a medial plane extending vertically through the aperture 189, extends laterally from the wall portion 178 and has downwardly converging surfaces 190 on opposite sides thereof (which are, as will be discussed more fully below, slightly divergent, as well). Secured to each of the surfaces 190, by use of screws 192, is a guideplate 194, the inside surface of which is indented at 196 to define a channel in cooperation with the confronting surface 190. The plates 194 are confined by an outer wall portion 198 on the base block 180.

A flat, planar cutting blade 200 is slidably engaged within each of the channels 196, and has a sharpened bottom edge defined by surfaces 201, and an aperture 202 through the top end thereof. A set screw 204 extends through the plate 194 to bear upon the blade 200, creating (when properly adjusted) frictional resistance to help maintain the blade in any selected position within the channel 196 while permitting ready movement thereof when desired, and also helping to permit manufacture with tolerances of practical magnitude.

The reason for the slight divergence of orientation, mentioned above, is to compensate for the fact that the blades enter the mat at non-perpendicular angles thereto, and to achieve full line contact between the outside surface 201 of the cutting edge (which is of course rectilinear and bevelled relative to the plane of the blade itself) and the cut produced in the workpiece; i.e., to provide as perfectly tangent a relationship as is feasible, and thereby to produce a virtually flawless cut edge regardless of the point of entry or withdrawal of the blade. Consequently, and although not visable in the drawings, the surfaces 190, 196, defining the channels in the base block of the head, are such that the planes of the blades are canted outwardly thereby, typically at an angle of about 5° (which is determined by resolution of the compound angular relationship presented by the several components), causing the blades to diverge from one another in a forward direction (i.e., toward the leading end of the head). As will be appreciated, reference to "outside" surfaces refers to the surfaces that are outermost with respect to the cutting head, one of which outside surface will of course run along the more inward of the lateral surfaces defining a cut edge or a V-groove. It will also be appreciated that the divergence described will dispose the rectilinear axes of the outside surfaces 201 of the cutting edges of the two blades parallel to one another.

Associated with each blade 200 is a positioning dial or spool, generally designated by the numeral 206, and consisting of a circular base portion 208 and cylindrical barrel or handle portion 210. A passageway 212 extends through the spool, and receives a mounting screw 214, the threaded end of which is engaged in a threaded aperture 216 in the lateral wall portion 178 of the cutter head body. The passageway 212 includes an enlarged diameter outer section 212′, with a circumferential shoulder formed at the inner end thereof. One end of a coil spring 218 is seated upon the internal shoulder, and the opposite end thereof bears upon the head of the screw 214, thereby creating a biasing force of adjustable strength to displaceably maintain the spool against the wall portion 178. Adjacent the aperture 216 is a semicircular slot 220, within which is engaged a short pin 222 extending from the inner face of the circular base portion 208 of the spool; this serves of course to limit rotation.

A small pin or finger 226 extends radially from a tapered intermediate section 224 of the barrel portion 210, which is engaged within the aperture 202 in the top end of the associated blade 200. As will be self-evident, turning of the positioning spool will serve to raise and lower the coupled blade, to an extent limited by the corresponding slot 220, so as to cause the cutting element thereof to move up and down through the bottom plane of the cutting head (i.e., the plane in which the lower surface of the marginal portion 181 and the tape piece 183 reside). The biasing force of the spring 218 will help to maintain the spool (and thereby the blade) in position, and the blade can be removed entirely from the head by disengagement of the finger 226 on the spool from its aperture 202. This is readily done by withdrawing the spool axially against the force of the spring 218, to disengage the pin 222 from the slot 220 and thereby permit rotation past the fully retracted position of the blade, as necessary to effect the desired disengagement. It will be noted that the edge of the wall portion 178 has a scale 228 on each shoulder, which cooperates with the indicating line 231 on the circumference of the spool base portion to permit reproducible adjustment of the extent of projection of the blade 200 beyond the bottom face 296 of the head.

An orientation control arm, generally designated by the numeral 230, is rigidly attached at one end (as by use of screws, not illustrated) to the underside of the lower bracket element 152, and extends laterally therefrom toward the center of the machine. A slot 232 is formed along most of the length of the arm 230, and engages the pin 124 that depends from the full slide 120.

Centrally mounted at the rear of the stand 14 of the machine is a locking block 236, having a channel in which is slidably received the tail piece 234 of a T-bar. The tail piece 234 has a distance scale 240 extending longitudinally along an upper surface, and the locking block 236 has a thumb screw 242 extending through it and through a clamping shoe (not visable) for securing the tail piece, and thereby the crosspiece 238 attached to its forward end, in any selected position over the base board 10. An inverted, U-shaped clamping member 244 is disposed over the crosspiece 238, and is substantially coextensive therewith.

Identical clamping mechanisms are provided at the opposite ends of the crosspiece and clamping member. Each consists of an L-shaped clamp head 246, having a nose portion 248 engaged under the base board 10 and a neck portion 250 seated within the space between the forward and rearward walls 252, 254 of the clamping member. Extending through aligned bores 256, 258 in the clamp head 246 and the crosspiece 238, respectively, and through an aperture 260 in the top wall 262 of the clamping member, is a rod 264 having a threaded lower end 266 and a transverse pin 268 through its upper end.

An operating lever, generally designated by the numeral 270, is assembled with the rod 264, and includes a handle portion 272 and a head portion, the latter comprising sidewalls 276 and an internal element 274, providing arcute bearing surfaces 278; the opposite ends of the pin 268 are engaged within the sidewalls 276. A nut 280, having a knurled knob thereon, is threadably engaged on the end 266 of the rod 264, and is seated within the clamp head 246. Interposed between the top wall 262 of the clamping member 244 and the upper surface of the crosspiece 238 is a coil spring 282. A small pin 284 (or preferably, a shoulder screw) projects rearwardly from the crosspiece 238, and is engaged within a slot 286 formed through the back wall 254 of the clamping member. The front wall 254 thereof is formed with a rib 288, below which is defined a dovetail groove 297 extending longitudinally therealong; the internal arcuate surface 278 of the lever 270 bears upon the top wall 262.

As will be apparent, in preparation to cut a workpiece such as the mat sheet 290 shown in the drawings the T-bar is initially positioned in the locking block 234 so as to properly locate the mat on the base board 10 (the latter normally having a slip sheet or covering sheet 291 thereupon for optimal utility). The clamping member is provided with a distance scale 296 along its forward wall portion 252, to permit ready centering of the workpiece, and an adjustable measuring stop (not shown) may be slidably mounted in the dovetail groove 297, if so desired, to further facilitate positioning. With the clamping member 244 in its elevated position (as shown in the several Figures), a marginal portion of the mat 290 can be inserted beneath the lower edge 294 of the front wall portion 252 to abut against the forward face of the crosspiece 23S. Elevating the handle portions 272 of the operating levers 270 will cause the underlying contacting surface (which may have a strip of high-friction and/or cushioning material applied thereto) of the clamping member 244 to be forced downwardly (by the action of the arcuate surfaces 278 upon the cooperating elements), thereby causing the edge surface to tightly grip the marginal portion of the mat 290.

Different thicknesses of workpieces can readily be accommodated by adjustment of the height of the clamping member 244. This is accomplished simply by tightening or loosening of the nuts 280, thereby raising or lowering the clamping member, as necessary.

To commence the cutting operation, the cutter arm 76 will be extended from the housing 72 a distance corresponding to the minor axis of the oval shape that is to be cut, utilizing the scale 80 thereon (which may be read directly to indicate the minor diameter). The knob 58 is loosened to permit shifting of the upper disk 34 (which would normally be done with the handle rotated 90° from the position shown in FIG. 1, so as to align the slot 36 with the gibs 30) to establish the desired offset, utilizing the indicator 70 in cooperation with the scale 38 on the disk 34; the sum of the offset value plus the cutter arm extension reading will equal the value of the major diameter of the oval to be cut. The coupled transmission bar 78 and the half-scale slide 90 are also extended from the housing 72 and the upper hub piece 96, respectively, to provide the same offset reading on the scale 92 as is indicated on the scale 38; the actuating slide 120 is extended from the lower hub piece 96 in which it is mounted, once again to provide the same offset reading on the scale 122.

The knurled collar 174 is thereafter rotated so as to bring the tape covered face 296 of the cutter head into sliding contact with the mat 290 (the tape 183 serving of course to promote sliding thereupon, and to prevent scuffing of the surface). Depending upon whether the mat is being cut from What is to be its front or its rear surface, one or the other of the blades 200 will then be extended as necessary to produce the desired degree of penetration, by turning of the associated spool 206.

Moving the handle 65 (in a counterclockwise direction) will of course cause the disk 34 and the center shaft assembly to rotate in the same direction. Due to the constraints imposed by the gibs 30 however, the center shaft assembly will be forced to slide along the slot 28 in the upper support arm 26, while the disk migrates back and forth along an axis parallel to the faces of the gibs. This will superimpose the established offset distance upon the otherwise circular path of the cutter head 150, thereby causing it to circumscribe an oval. (As will be self-evident, if the center shaft assembly were positioned at the center of the disk 38 the resultant shape would be that of a circle, since no offset Would be imposed.)

As the center shaft rotates on its own axis, and simultaneously moves back and forth through the centerline of the machine, the geometry of the system (with the slides set as described) will cause the pin 86 on the transmission bar 78 to follow a circular path, in a clockwise direction (i.e., opposite to the direction of rotation of the disk 34). As a result, the hub assembly will rotate in the same direction within the center bracket 116, in turn causing the pin 124 to move clockwise and to circumscribe a circular path.

Rotational movement of the pin 124 (following its circular path) within the slot 232 of the orientation bracket 230 will translate to a reciprocating pivotal action to the cutter head 150. Again due to geometric principles (which will be discussed hereinbelow), pivoting of the head under such control will constantly maintain the cutting axis of blade 200 in a relationship of true tangency to the oval path being followed, thereby producing a virtually perfect cut in the mat 290.

To enable the pin 86 to move in a circle, in response to the compound movements of the center shaft assembly, it is necessary that the radius of the path circumscribed by the pin 86 (taken from the centerline of the machine) be exactly one-half the value of the offset distance set on the scale 38. To facilitate that, the actual distances between indicia on the scale 92 on the half-scale slide 90 are one-half those that are provided between common indicia on the scale 38; thus, one need only set the cooperating parts at the same integer or graduation markings on the scales to achieve the required relationship. The distances on the scale 122 of the actuating slide 120 are the same as those on scale 38, to facilitate setting of the slide so as to enable the pin 124 to follow a path (about the centerline) having a radius equal to the offset distance, as is necessary to produce the required orientation control for the cutter head. As noted previously, the markings on the scale 80 denote minor diameter lengths, and so the actual distances between integers are half of the values indicated.

The cutting head employed on the machine can readily be utilized for so-called "V-grooving" of mat board. To do so it is simply a matter of making a first cut with one of the blades in operative position, and thereafter making a second cut, along the same path, utilizing the other blade. As has been noted, the surfaces of the base portion against which the blades are mounted converge at an angle suitable to cause the blades to produce, by their cooperative action, a V-shaped cut.

It might also be emphasized that the machine of the invention, and the underlying concepts, are applicable for cutting or scoring of workpieces other than mat board, such as plastic and glass; of course different forms of cutting heads, and elements, appropriate to the material of the workpiece, would be employed. For example, a suitable glass cutting head might consist of a body having means for securely but disengageably mounting it on the leg portion 176 of the bracket 150, in substantially the same position and orientation as the body of the head assembly shown in the embodiment of FIG. 6. The body of the glass cutting head would however desirably have a socket extending upwardly from a bottom surface, in which would be slidably engaged the stem of a pillar post, supporting a cutting wheel on an outer end portion thereof. The pillar post would be biased outwardly, to cause the cutting wheel to project beyond the bottom surface of the body, and also to yield as necessary to thereby ensure that a well-controlled score line is produced. A vertical slot in the body would advantageously engage, for slidable movement therewithin, a pin that is attached to the stem of the pillar post. The pin would serve to prevent disassembly under the force of the biasing spring, and also to maintain precise orientation of the cutting wheel; it would in addition provide a visual indication of the level of spring force to which the wheel is being subjected.

As a further alternative, the cutting head body could be fitted with an embossing Wheel, to add desired aesthetics to the workpiece. As is conventional, such a wheel is formed with a rounded circumferential edge cross section, and is used to impress an indentation in the surface of a mat board along the travel path of the head.

Turning finally to FIGS. 5A–5E of the drawings, therein illustrated schematically and sequentially is the manner in which the cutter head orienting bracket moves, during the cutting of one quadrant of an oval so as to control orientation of the cutter head and thereby maintain the blades in relationships of precise tangency. The Figures also illustrate the geometric principles underlying the operation of the machine illustrated. (It should be noted that the directions of movement are arbitrarily chosen to be opposite to those entailed in the machine embodiment hereinbefore described.)

As the cutting head moves along an oval path "f," the locus of a point "C" on the axis of the cutter bar 76 (the bar axis being represented by the dash line "1" in these Figures) is a circle "c" generated in the direction opposite to that in which the cutter head proceeds. Orientation of the cutter bar is controlled by constraining points A and B (separated by the offset distance) on its axis to movement on perpendicular Y and x axes through the point "0" at the center of the machine (and hence at the center of the oval shape "f" generated); point "A" corresponds to the rotational axis of the center support assembly of the machine, and point "B" may be considered to be the geometric center of disk 34, which follows an imaginary point on the axis of the cutter bar moving along an axis midway between the confronting gib surfaces. Since the pin 86 of the machine is positioned at point C, midway between points A and B, it generates the circle "c" having a radius equal to half the offset distance.

In the Figures, the diameter of circle "a" corresponds to the minor diameter of the oval "f", and the radius of circle "b" equals the machine offset distance. Adding the diameter of circle "b" to the minor diameter circle "a" provides the major diameter of the oval, corresponding to the diameter of circle "d"; circle "e" is drawn to have the diameter of tangency, equal to the sum of the major and minor diameters. For example, setting the cutter bar to provide a six-inch minor diameter, and setting the upper disk to provide a two-inch offset, will produce an ellipse with an eight-inch major diameter. If the same offset value is set on the scales 92 and 122, the locus of pin 86 will be a two-inch diameter circle, and that of pin 124 will be a circle having a four-inch diameter.

As can be seen, and by way of explanation of the theory of operation of the mechanism, a line "2" drawn through point D on the offset radius circle "b", and point E on the tangency circle "e", will be perpendicular to a line of tangency "3" at all points on the oval "f". Consequently, disposing the arm 230 between the cutter head bracket 150 and the pin 124 (the latter corresponding to point D, at the offset distance and aligned on a axis "4" through the center point "0" and point "C") will impart the desired, always-tangent orientation to the axis of cutting of blade 200. It will be appreciated that the alignment of points "0", "C" and "D" on the axis "4" is produced in the machine by the relationships of the half-scale and full-scale slides 90, 120 in the hub assembly.

Point "E" on the tangency circle "e" lies at the intersection of a line drawn parallel to the axis "1" of the cutter bar through the center point "0". The cutting blade 200 is located at the intersection of lines "6" and "7", drawn parallel to the y and x axes of the machine from points F and G, respectively; points "F" and "G" lie at the intersections of line 5 with minor and major diameter circles "a" and "d". (It will be noted that some of the reference lines and points have been omitted from certain Figures, for clarity of illustration.)

As will be appreciated, the dynamic position of point D will reside at the intersection with circle "b" of a line through point A drawn parallel to the x axis, and also of a line through point B drawn parallel to the y axis, the intersection of both lines with circle "b" serving of course to locate point D in the proper quadrant. The foregoing geometric factors can readily be applied in the design of a mechanism having the unique true tangent characteristic herein described; it is not believed that these principals have heretofore been recognized, or so applied.

Thus, it can be seen that the present invention provides a novel machine for cutting shapes in planar workpieces, which permits facile and effective clamping and precise positioning of the workpiece, and which permits accurate cutting of bevels from either the front or back of the workpiece, and convenient and accurate V-grooving thereof. The clamping system is, in addition, of relatively uncomplicated design and construction, it does not intrude into the cutting space, and it imposes no load on the cutting mechanisms or on the support structure therefor. The cutting head is also of relatively uncomplicated design and construction, and it is capable of readily disposing either of two blades in an optimal position for effective cutting of the workpiece.

Having thus described the invention, what is claimed is:

1. In a machine for cutting shapes in a planar workpiece, the combination comprising:
   (a) a frame;
   (b) a base attached to said frame, said base having a back portion with parallel, rectilinear marginal side edges, and having a planar upper surface for disposing a planar workpiece in position for cutting by said machine;
   (c) structure on said frame for supporting a mechanism for mounting a cutting head assembly proximately over said base, and for moving said assembly for cutting a workpiece disposed on said surface thereof;
   (d) a cutting head assembly so mounted by said mechanism; and
   (e) a clamping system for securing a workpiece in such position on said surface; said head assembly comprising:
   (1) a head including a lateral wall portion and a base portion extending laterally from said wall portion adjacent the bottom thereof, said head having a bottom surface providing a lowermost element disposed substantially in a bottom plane thereof, and said base portion having sides with downwardly convergent, substantially rectilinear channels therein disposed to opposite sides of a medial plane thereof and opening to said bottom plane, the planes in which said channels lie intersecting one another below said bottom plane;
   (2) a pair of cutting blades with opposite ends, each of said blades having a cutting element on one of said opposite ends and an engagement element adjacent the other of said ends, one of said blades being slidably mounted in each of said channels with said cutting element thereof downwardly disposed, and with said engagement element thereof disposed outwardly of the upper end of the associated one of said channels; and
   (3) a pair of operating members rotatably mounted on said wall portion and extending laterally therefrom over said base portion, said operating members having contacting portions adapted to facilitate manual rotation thereof, and having engagement elements thereon adapted to cooperate with said engagement element of said blades to translate rotary movement of said operating members into substantially linear movement of said blades, on of said operating members being positioned proximate each of said blades and said engagement elements thereof being operatively interengaged to effect such cooperative movement therebetween, to thereby effect extension and retraction of said blades to move said cutting elements thereof through said bottom plane; and said clamping system comprising:
   (4) a T-bar having a rectilinear crosspiece of a length greater than the width of said base back portion, and an elongate, rectilinear tail piece having one end affixed to said crosspiece at a location intermediate the ends thereof, said crosspiece having opposite end portions, each with a bore extending from top to bottom therethrough and disposed outwardly of said base portion marginal edges;
   (5) an elongate, rectilinear clamping piece having a lengthwise channel extending upwardly thereinto and seating said crosspiece of said T-bar therewithin, said clamping piece having a front wall portion with a rectilinear lower edge along the length thereof providing an underlying contact surface for grippingly engaging a planar workpiece against said base upper surface, said clamping piece also having opposite end portions with apertures therethrough in overlying registry with said bores of said crosspiece, and having a bearing surface upwardly disposed thereon;
   (6) a pair of clamping assemblies, each comprising a clamping head, a jacking member, and an elongate tensioning member extending therebetween and having upper and lower end portions secured to said jacking member and clamping head, respectively, an intermediate portion of said tensioning member of each of said clamping assemblies passing through the aligned bore and aperture, respectively, of the associated end portions at one end of said crosspiece and clamping piece, each of said clamping heads having an engagement portion disposed in underlying engagement with said base along one of said marginal edges thereof, and each of said jacking members being mounted on said upper end portion of said tensioning member associated therewith for pivotable movement about an axis perpendicular to the longitudinal axis thereof, and having at least one arcuate surface thereon adapted and disposed so as to bear upon said bearing surface of said clamping piece, and to apply downward force thereto during movement of said jacking member from a first position to a second position thereof, so as to thereby urge said contact surface of said clamping piece toward said base upper surface; and (7) a clamping block disposed adjacent said base back portion and adapted to slidingly engage said tail piece of said T-bar therewithin for disposing said crosspiece and clamping piece at selected positions on said upper surface along said back portion of said base, said tail piece and clamping block having means thereon for cooperatively disengageably securing said tail piece in any such selected position.

2. A cutting head assembly adapted for use in a machine for cutting shapes, said head assembly comprising:

(1) a head including a lateral wall portion and a base portion extending laterally from said wall portion adjacent the bottom thereof, said head having a bottom surface providing a lowermost element disposed substantially in a bottom plane thereof, and said base portion having means thereon defining downwardly convergent, substantially rectilinear channels disposed to opposite sides of a medial plane thereof and opening to said bottom plane, the planes in which said channels lie intersecting one another below said bottom plane;

(2) a pair of cutting blades with opposite ends, each of said blades having a cutting element on one of said opposite ends and an engagement element adjacent the other of said ends, one of said blades being slidably mounted in each of said channels with said cutting element thereof downwardly disposed and with said engagement thereof disposed outwardly of the upper end of the associated one of said channels, said means defining said channels constraining said blades to slidable movement therewithin; and (3) a pair of operating members rotatably mounted on said wall portion, said operating members having contacting portions adapted to facilitate manual rotation thereof, and having engagement elements thereon adapted to cooperate with said engagement element of said blades to translate rotary movement of said operating members into substantially linear movement of said blades, one of said operating members being positioned proximate each of said blades and said engagement elements thereof being operatively interengaged to effect such cooperative movement therebetween, to thereby effect extension and retraction of said blades to move said cutting elements thereof through said bottom plane.

3. The assembly of claim 2 wherein each of said blades is of rectilinear form, with parallel side edges extending between said opposite ends thereof.

4. The assembly of claim 2 wherein each of said operating members comprises a disk portion and a stem portion extending therefrom, said stem portion providing said contacting portion, and said operating members being mounted with said disk portions disposed against a surface of said wall portion for rotation about an axis normal thereto, on which axis said stem portion extends.

5. The assembly of claim 4 wherein each of said operating members is a dial, and wherein said disk portion thereof and said wall portion of said head have cooperating indicia thereon to indicate positions of angular displacement of said disk relative to said wall portion.

6. The assembly of claim 5 wherein said wall portion of said head has shoulder elements disposed outwardly thereon, each having an arcuate edge profile with a radius substantially equal to the radius of said disk portion of said dials, and carrying said indicia thereon; and wherein each of said dials is mounted with the circumferential edge of said disk portion thereof in registry with said edge profile of one of said shoulder elements, said circumferential edge of said disk portion carrying said indicia thereon.

7. The assembly of claim 2 wherein said engagement elements on said operating members comprise pins extending generally radially from said stem portions thereof, and wherein said engagement elements of said blades comprise apertures configured to engagingly receive said pins.

8. The assembly of claim 7 wherein said wall portion and each of said operating members have normally interengaged limiting elements therein for limiting rotation of said operating member between positions in which the associated blade is extended from said associated channel and is retracted thereinto, and wherein said assembly includes means for biasing said operating members against said wall portion and for thereby maintaining said limiting elements in such interengagement, said operating members being readily displaceable away from said wall portion, against the force of said means for biasing, to thereby disengage said limiting elements so as to permit further rotation of said operating member beyond said position of retraction of said associated blade, said pin of said operating member being so dimensioned and configured as to disengage from said aperture of said associated blade when said operating member is so further rotated, to thereby facilitate removal of said associated blade 9. The assembly of claim 2 wherein said assembly includes means for applying restraining force for maintaining said blades in any selected position within said channels of said head.

10. The assembly of claim 2 wherein said wall portion is of symmetrical form, having an axis of symmetry lying in a medial plane between said planes in which said channels lie.

11. The assembly of claim 10 additionally including means for pivotably mounting said head, the axis of pivoting of said head lying substantially in said medial plane and in a plane including the longitudinal medial axes of said blades.

12. A cutting head assembly adapted for use in a machine for cutting shapes, said head assembly comprising:

(1) a head including a base portion having a bottom surface providing a lowermost element disposed substantially on a bottom plane, and having sides with downwardly convergent, substantially rectilinear channels disposed to opposite sides of a medial plane of said base portion and opening to said bottom plane, the planes in which said channels lie intersecting one another below said bottom plane;

(2) a pair of cutting blades, each having a cutting element on one end thereof and an engagement element spaced therefrom, one of said blades being slidably mounted in each of said channels with said cutting element thereof downwardly disposed; and (3) a pair of operating members rotatably mounted on said head, said operating members having contacting portions adapted to facilitate manual rotation thereof, and having engagement elements thereon adapted to cooperate with said engagement elements of said blades to translate rotary movement of said operating members into substantially linear movement of said blades, one of said operating members being positioned proximate each of said blades and said engagement elements thereof being operatively interengaged to effect such cooperative movement therebetween, to thereby effect extension and retraction of said blades to move said cutting elements thereof through said bottom plane.

13. A cutting head assembly adapted for use in a machine for cutting shapes, said head assembly comprising:

(1) a head including a base portion having a bottom surface providing a lowermost element disposed substantially on a bottom plane, and having sides with downwardly convergent, substantially rectilinear channels disposed to opposite sides of a medial plane of said base portion and opening to said bottom plane, the planes in which said channels lie intersecting one another below said bottom plane;

(2) a pair of cutting blades, each having a cutting element on one end thereof and an engagement element spaced therefrom, one of said blades being slidably mounted in each of said channels with said cutting element thereof downwardly disposed, said cutting element being comprised of a flat, rectilinear bevel surface outwardly disposed on said blade, said channels mounting said blades in such an orientation that the rectilinear axes of said bevel surfaces thereon are parallel to one another; and (3) a pair of operating members mounted on said head, said operating members having engagement elements thereon adapted to engage and cooperate with said engagement elements of said blades to translate movement of said operating members into substantially linear movement of said blades, and thereby to effect extension and retraction of said blades to move said cutting elements thereof through said bottom plane.

14. The assembly of claim 13 wherein said head has a forward end, and wherein said blades comprise flat, planar bodies sharpened at said one end to provide said cutting elements thereon, the planes of said blade bodies being mounted by said channels with a forwardly divergent orientation to so dispose said rectilinear axes of said bevel surfaces 15. The assembly of claim 14 wherein said planes of each of said blade bodies is disposed at an angle of about 5° to said medial plane.

16. A clamping system, adapted for use in a machine for cutting shapes in a planar workpiece, for securing the workpiece in position for cutting, said clamping system comprising:

(1) a base having a back portion with parallel, rectilinear marginal side edges, and having a planar upper surface for disposing a planar workpiece in position for cutting;

(2) a T-bar having a rectilinear crosspiece of a length greater than the width of said base back portion, and an elongate, rectilinear tail piece having one end affixed to said crosspiece at a location intermediate the ends thereof, said crosspiece having opposite end portions, each with a bore extending from top to bottom therethrough and disposed outwardly of said base portion marginal edges;

(3) an elongate, rectilinear clamping piece having a lengthwise channel extending upwardly thereinto and seating said crosspiece of said T-bar therewithin, said clamping piece having a front wall portion with a rectilinear lower edge along the length thereof providing an underlying contact surface for grippingly engaging a planar workpiece against said base upper surface, said clamping piece also having opposite end portions with apertures therethrough in overlying registry with said bores of said crosspiece, and having bearing surface upwardly disposed thereon;

(4) a pair of clamping assemblies, each comprising a clamping head, a jacking member, and an elongate tensioning member extending therebetween and having upper and lower end portions secured to said jacking member and clamping head, respectively, an intermediate portion of said tensioning member of each of said clamping assemblies passing through the aligned bore and aperture, respectively, of the associated end portions at one end of said crosspiece and clamping piece, each of said clamping heads having an engagement portion disposed in underlying engagement with said base along one of said marginal edges thereof, and each of said jacking members being mounted on said upper end portion of said tensioning member associated therewith for pivotable movement about an axis perpendicular to the longitudinal axis thereof, and having at least one arcuate surface thereon adapted and disposed so as to bear upon said bearing surface of said clamping piece, and to apply downward force thereto during movement of said jacking member from a first position to a second position thereof, so as to thereby urge said contact surface of said clamping piece toward said base upper surface; and (5) a clamping block disposed adjacent said base back portion and adapted to slidingly engage said tail piece of said T-bar therewithin for disposing said crosspiece and clamping piece at selected positions on said upper surface along said back portion of said base, said tail piece and clamping block having means thereon for cooperatively disengageably securing said tail piece in any such selected position.

17. A clamping mechanism, adapted for use in a machine for cutting shapes in a planar workpiece, for securing the workpiece in position for cutting upon a base having a back portion with marginal side edges and a planar upper surface, said clamping assembly comprising:

(1) a rectilinear crosspiece having opposite end portions, each with a bore extending from top to bottom therethrough;

(2) an elongate, rectilinear clamping piece having a lengthwise channel extending upwardly thereinto and seating said crosspiece, said clamping piece having a front wall portion with a rectilinear lower edge along the length thereof providing an underlying contact surface for grippingly engaging a planar workpiece against the upper surface of a cooperating base, said clamping piece also having opposite end portions with apertures therethrough in overlying registry with said bores of said crosspiece, and having bearing surface upwardly disposed thereon; and (3) a pair of clamping assemblies, each comprising a clamping head, a jacking member, and an elongate tensioning member extending therebetween and having upper and lower end portions secured to said jacking member and clamping head, respectively, an intermediate portion of said tensioning member of each of said clamping assemblies passing through the aligned bore and aperture, respectively, of the associated end portions at one end of said crosspiece and clamping piece, each of said clamping heads having an engagement portion adapted and disposed for underlying engagement with such a base along one of the marginal side edges thereof, and each of said jacking members being mounted on said upper end portion of said tensioning member associated therewith for pivotable movement about an axis perpendicular to the longitudinal axis thereof, and having at least one arcuate surface thereon adapted and disposed so as to bear upon said bearing surface of said clamping piece, and to apply downward force thereto during movement of said jacking member from a first position to a second position thereof, so as to thereby urge said contact surface of said clamping piece toward the base upper surface.

18. The mechanism of claim 17 wherein said clamping piece is of U-shaped cross section, inverted in said mechanism, to provide, in addition to said front wall portion and joined thereto, a rear wall portion and a top wall portion, said top wall portion at least in part providing said bearing surface on said clamping piece.

19. The mechanism of claim 17 wherein each of said assemblies includes fastening means for securing said lower end portion of said tensioning member to said clamping head, said fastening means being adjustably engaged with said lower end portion to vary the spacing between said jacking member and said clamping head, said assembly also including biasing means for exerting a separating force upon said jacking member and clamping head.

* * * * *

UNITED STATES PATENT AND TRADEMARK OFFICE
CERTIFICATE OF CORRECTION

PATENT NO. : 5,033,346

DATED : July 23, 1991

INVENTOR(S) : Vincent T. Kozyrski and Alan R. Peters

It is certified that error appears in the above-identified patent and that said Letters Patent is hereby corrected as shown below:

Claim 1, column 14, line 19 please delete "on" and substitute therefor --one--.

Signed and Sealed this

Twenty-fourth Day of November, 1992

Attest:

DOUGLAS B. COMER

*Attesting Officer*     Acting Commissioner of Patents and Trademarks